United States Patent [19]
Dixon et al.

[11] Patent Number: 5,075,172
[45] Date of Patent: Dec. 24, 1991

[54] ELECTROLUMINESCENT ELECTRODE MADE OF A TRIS BIPYRIDYL RUTHENIUM COMPLEX EMBEDDED IN A PERFLUORINATED POLYMER AND DEPOSITED ON A TRANSPARENT ELECTRODE

[75] Inventors: Brian G. Dixon, Sandwich; John R. Deans, East Falmouth; Robert S. Morris, Fairhaven; John P. Sanford, Middleboro, all of Mass.

[73] Assignee: Cape Cod Research, Falmouth, Mass.

[21] Appl. No.: 506,808

[22] Filed: Apr. 10, 1991

[51] Int. Cl.[5] ...................... B32B 25/02; C09K 11/87; C09K 11/02

[52] U.S. Cl. .................................... 428/422; 428/442; 252/301.36; 252/301.33

[58] Field of Search .................... 252/301.33, 301.36, 252/700; 428/422, 442

[56] References Cited

U.S. PATENT DOCUMENTS 4,672,221 6/1987 Saito .................................... 250/578
4,752,115 6/1988 Murray ............................ 350/96.29

OTHER PUBLICATIONS

Rubinstein, Nafion Coated Electrodes and Electrogenerated Chemiluminescence of Surface-Attached $Ru(bpy)_3^{2+}$, *Journal of the American Chemical Society*, 1980, pp. 6641, 6642.

Kaneko, Application of Polymer-Embedded Tris(2,2'-)Bipyridiane-Ruthenium(II) to Photodetection of Oxygen, *Journal of Macromolecular Science-Chem.*, 1988, pp. 1255-1261.

*Primary Examiner*—Prince Willis, Jr.
*Assistant Examiner*—Thomas Steinberg

[57] ABSTRACT

An electrochemiluminescnt layer for use in apparatus for determining the concentration levels of pollutants in water by measuring the increase in light emission of a luminescent surface electrochemically excited by a supporting electrode surface, where a tris bipyridyl ruthenium complex forms a homogeneous mixture with a perfluorinated, sulfonated polymer film, deposited on a transparent, electrically conductive surface, in which case the surface may also have a fine-grained structure.

2 Claims, No Drawings

ELECTROLUMINESCENT ELECTRODE MADE OF A TRIS BIPYRIDYL RUTHENIUM COMPLEX EMBEDDED IN A PERFLUORINATED POLYMER AND DEPOSITED ON A TRANSPARENT ELECTRODE

This invention was made with Government support under Contract No. F08635-88-C-0258 awarded by the Department of Defense. The Government has certain rights in this invention.

The present invention relates to a method for analyzing the chemical composition and concentration of aqueous solutions using electrochemiluminescence. In particular this invention relates to improved electrochemiluminescent layers for use in apparatus for monitoring the composition of aqueous solutions.

Electrochemiluminescence, referred to as ECL for brevity, is a means for converting electrical energy to light at low voltages. ECL is produced at one or more electrodes in a solution having three components: a solvent, an electrolyte, and a luminescor. The electrolyte makes the solvent conducting, and the luminescor is the active member in the electrochemical emission of light.

Hereto, ECL devices, generally referred to as cells, have been usefully employed for generating light. Devices now provide for long stable operating life and good luminance, together with increased efficiency. Said devices are hermetically sealed and are free of dissolved oxygen and water.

This application is directed to improved ECL layers for use in apparatus open to the environment for determining the levels of organic compounds dissolved in water, especially petroleum contaminated ground water. Surprisingly under these conditions we have found that useful changes in ECL take place when our improved ECL layers contact dissolved organic materials. Apparatus for measuring changes in ECL are well know as are methods for relating changes in intensity of emitted light to changes in levels of organic compounds dissolved in water.

It has now been found that good and useful measuring results can be obtained when the solvent is water, the electrolyte comprises a thin layer of solid, light-transparent, ion-exchange material, and the luminescor is incorporated therein in such a way that a homogeneous mixture or dyeing of the solid electrolyte is obtained.

The characteristics of the layer substances, which in all cases must be very light-transparent, may be selected according to the intended usage. If, for example, a luminescor is selected that gives efficient ECL in aqueous solution, measuring signals are obtained that sensitively depend on the impurities in the water. For the preparation of the ECL layers according to the invention, the following methods or their combinations may be used, among others:

1. The layer substance and the luminescor are dissolved together in a suitable solvent or a combination of solvents, and the solution is then distributed on the light-emitting electrode. The ECL layer is obtained after evaporation of the solvent.
2. Ion exchange material is coated onto the light emitting electrode by solvent deposition, by solvent deposition followed by chemical reaction to form ion exchange groups thereon, or by electropolymerization. The luminescor is then dissolved in a suitable solvent or a combination of solvents. The solution is then distributed on the ion exchange material.
3. Monomers or oligomers are mixed with the fluorescor, possibly while adding a suitable solvent, the mixture is distributed on substrate, and polymerization is started.

Perfluorinated polymer possessing pendant sulfonic groups (e.g., Nafion 117 perfluorinated ion-exchange powder, 5 wt % solution in a mixture of lower aliphatic alcohols and 10% water, Aldrich Chemical Co., Milwaukee, Wis. 53201) has proven to be an especially suitable layer substrate. This material has a polytetrafluoroethylene backbone with pendant side chains terminating with sulfonic groups.

All ECL dyes which give off light in aqueous systems can be used as the luminescor. Dyes which have proven to be well suited are metal chelates being capable of producing stable ion radicals at a predetermined potential, the radicals taking part in a reaction in which excited states are formed and then annihilated with the eventual emission of light. A suitable fluorescor is the tris (2,2'-bipyridyl)ruthenium salt complex. This is commercially available as the chloride hexahydrate. This dissolves in aqueous solution and forms positive ions which readily react with bound sulfonic groups to form insoluble ECL layers.

Dyes which emit light in the visible range of the electromagnetic spectrum are especially preferred because silicon based photodetectors and inexpensive fiberoptic cable can be used in the design of the apparatus for determining the contamination of ground water.

In as much as a surface of the ECL layer is desired that is as large as possible, it is especially advantageous to apply this ECL layer not to a plane electrode substrate, such as a smooth platinum foil, but to an electrode substrate the surface of which is not smooth. Such a substrate is, by way of example but not by way of limitation, an etched glass surface layered with a light transparent, electrically conductive, fine-grained substance such as tin oxide doped with indium. The grain size of the fine grain substance should be smaller than 1 mm, preferably less than 0.1 mm.

It was also found that the thickness of the layer containing the luminescor has no influence on the measuring result so that, in the case of the layer according to the invention, varying layer thickness caused by process tolerances are of no disadvantage.

EXAMPLE

A 1 $cm^2$ smooth platinum flag was dipped into a 5% solution of perfluorinated polymer in a mixture of lower aliphatic alcohols and 10% water (Nafion$^r$ 117, Aldrich Chemical Co.). The coating was air dried at 95° C. to dehydrate the Nafion$^r$ and to render it water insoluble. This procedure was repeated four times in order to obtain a homogeneous layer. Luminescor was introduced into this transparent layer by soaking for eight hours in a 0.005M solution of tris (2,2'-bipyridyl) ruthenium (II) chloride hexahydrate (Aldrich Chemical Co.) in 0.1M sulfuric acid. The layer was washed with copious quantities of water and air dried.

By means of such a layer, background ECL was produced in the following representative apparatus. A 0.025M sodium oxalate solution is placed in a 100 mL quartz cell containing a platinum counter electrode, a saturated calomel electrode (SCE) and the coated 1 $cm^2$ flag. A potentiostatic power supply is connected to these three electrodes in order to apply a predetermined constant voltage to the coated electrode with respect to the SCE ECL of the layer is observed with the aid of a photomultiplier-detector (e.g., Oriel Corporation Model 77345). The background emission from the ECL layer cf this example is between 590 and 750 nm with a maximum intensity at about 640 nm. A voltage of approximately 1.0 V vs SCE is required for ECL under these conditions. No ECL is observed below 0.8 V vs SCE. Higher voltages increase background ECL only slightly.

To the aqueous sodium oxalate solution in this cell is added a representative organic pollutant, benzene. In the presence of 25 ppb benzene, the total ECl is observed to increase by 15%. Simple cleaning of the cell with water and a replication of this experiment gives nearly identical results.

In a further experiment 48 ppb of benzene is added to the cell. The total ECL is seen to rise by approximately 30% above background level.

The.above examples show that the ECL layer of this invention is well suited for monitoring benzene levels in water.

While only a limited number of embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. An electrochemiluminescent (ECL) electrode for use in apparatus for monitoring the concentration of organic materials in water, comprising:

(a) an ECL layer consisting of a homogenous mixture of a tris (2, 2'-bipyridyl) ruthenium complex and a polytetrafluoroethylene polymer backbone with pendant sidechains terminating with sulfonic groups, deposited on (b) an etched glass substrate layered with a light transparent, electrically conductive, fine grained substance for supporting and electrochemically activating said ECL layer.

2. The ECL electrode of claim 1 wherein the light transparent, electrically conductive, fine grained substance is tin oxide doped with indium.

* * * * *